United States Patent
Frye

(10) Patent No.: US 8,327,982 B2
(45) Date of Patent: Dec. 11, 2012

(54) ACTUATOR/COUPLER FOR TOWED AND TOWING VEHICLE COMBINATION

(75) Inventor: Dave E. Frye, Des Moines, IA (US)

(73) Assignee: Titan International, Inc., Quincy, IL (US)

( * ) Notice: Subject to any disclaimer, the term of this patent is extended or adjusted under 35 U.S.C. 154(b) by 1347 days.

(21) Appl. No.: 10/200,734

(22) Filed: Jul. 22, 2002

(65) Prior Publication Data

US 2003/0201141 A1   Oct. 30, 2003

Related U.S. Application Data

(60) Provisional application No. 60/376,781, filed on Apr. 30, 2002.

(51) Int. Cl.
*B60T 7/20* (2006.01)

(52) U.S. Cl. .................. 188/112 R; 188/142; 303/7

(58) Field of Classification Search .............. 188/112 A, 188/112 R, 142, 149, 150, 3 H, 151 A; 303/7; 280/486, 487, 491.2
See application file for complete search history.

(56) References Cited

U.S. PATENT DOCUMENTS

| | | |
|---|---|---|
| 1,254,199 A | 1/1918 | Brice |
| 2,179,432 A | 11/1939 | Schroeder et al. |
| 2,435,024 A | 1/1948 | Wagner |
| 2,459,448 A | 1/1949 | Murray |
| 2,716,471 A | 8/1955 | Long |
| 2,732,222 A | 1/1956 | Harroun |
| 2,815,778 A | 12/1957 | Holman |
| 2,855,222 A | 10/1958 | Bolmes |
| 2,954,104 A * | 9/1960 | Shumate .................. 188/112 R |
| 3,049,366 A | 8/1962 | Peters |
| 3,153,545 A | 10/1964 | Bolmes et al. |
| 3,180,455 A | 4/1965 | De Puydt |
| 3,241,639 A | 3/1966 | De Puydt et al. |
| 3,446,520 A | 5/1969 | Gibson et al. |
| 3,567,253 A | 3/1971 | De Puydt et al. |
| 3,734,540 A | 5/1973 | Thiermann |
| 3,830,580 A | 8/1974 | Slattery et al. |
| 3,888,517 A | 6/1975 | Ray |
| 4,239,252 A | 12/1980 | Huetsch et al. |
| 4,393,655 A | 7/1983 | Komorizono |
| 4,416,467 A | 11/1983 | Bradley |
| 4,817,979 A | 4/1989 | Goettker |

(Continued)

FOREIGN PATENT DOCUMENTS

CA    618135    4/1961

*Primary Examiner* — Xuan Lan Nguyen
(74) *Attorney, Agent, or Firm* — Davis Brown Law Firm; Emily Harris

(57) ABSTRACT

An actuator/coupler device having a housing connected to a towed vehicle and a coupler attached to a towing vehicle, wherein the coupler is secured to the housing through a pair of opposing roller shafts extending through a slot within the coupler and a hole in the housing. Rollers secured to the roller shafts bear on a surface within the generally hollow interior of the coupler. A brake actuator secures within the coupler, wherein a first end of the brake actuator is secured to the rear roller shaft and a second end is fixed to the coupler, wherein the brake actuator is in operable communication with the brakes of the towed vehicle such that the brake actuator is actuated by movement of the coupler relative to the housing. A coupler ball socket is included within the coupler for releasable attachment of the coupler ball connected to the towing vehicle.

8 Claims, 14 Drawing Sheets

U.S. PATENT DOCUMENTS

| | | | |
|---|---|---|---|
| D305,319 S | 1/1990 | Goettker | |
| 5,013,059 A | 5/1991 | Goettker | |
| 5,040,816 A | 8/1991 | Goettker | |
| 5,346,289 A * | 9/1994 | Cords et al. | 303/7 |
| 5,464,078 A * | 11/1995 | Pittman | 188/112 R |
| 5,485,900 A * | 1/1996 | Denny | 188/112 R |
| 5,771,996 A * | 6/1998 | Marasco | 188/112 R |
| 6,098,762 A | 8/2000 | Reimann et al. | |
| 6,267,043 B1 | 7/2001 | Plantan et al. | |
| 6,318,240 B1 | 11/2001 | Plantan et al. | |
| 2001/0030092 A1 * | 10/2001 | Pribula et al. | 188/112 R |

* cited by examiner

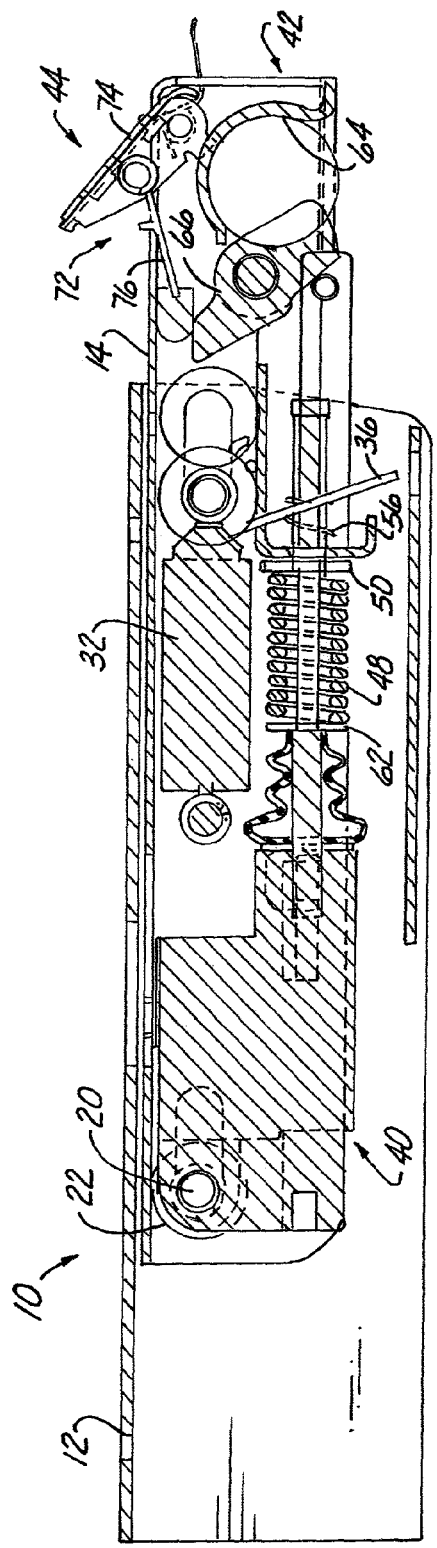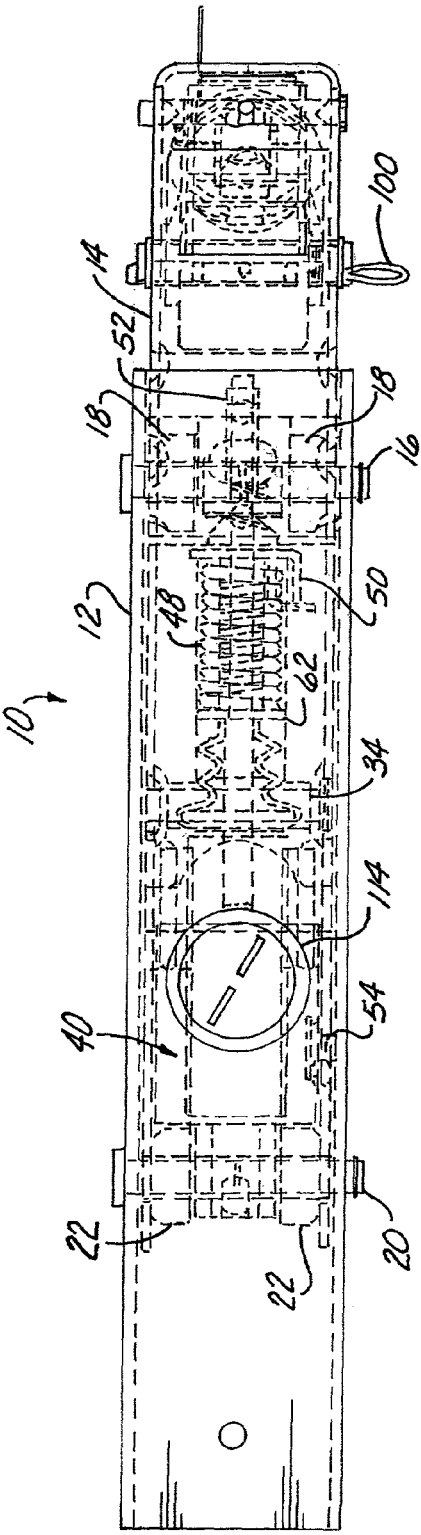
Fig. 9
Fig. 10

Fig. 17
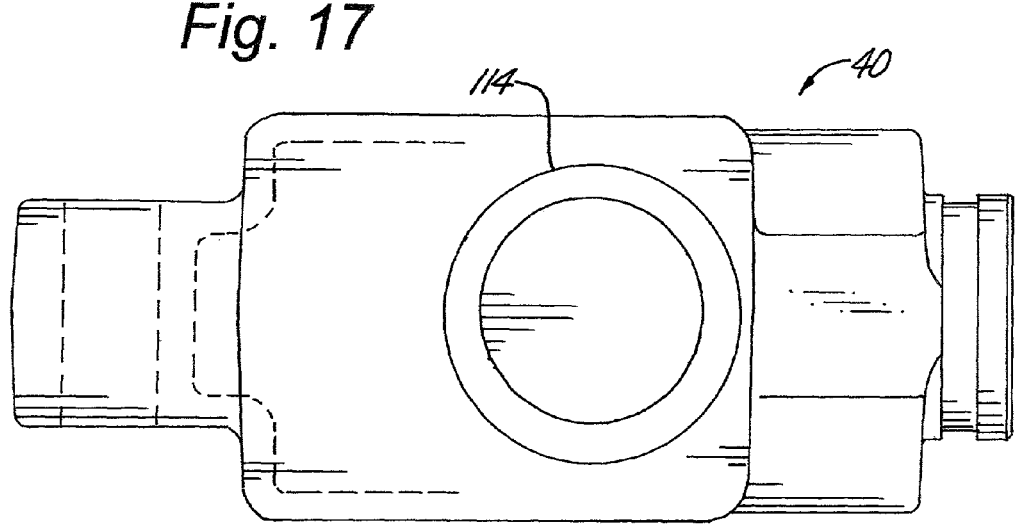
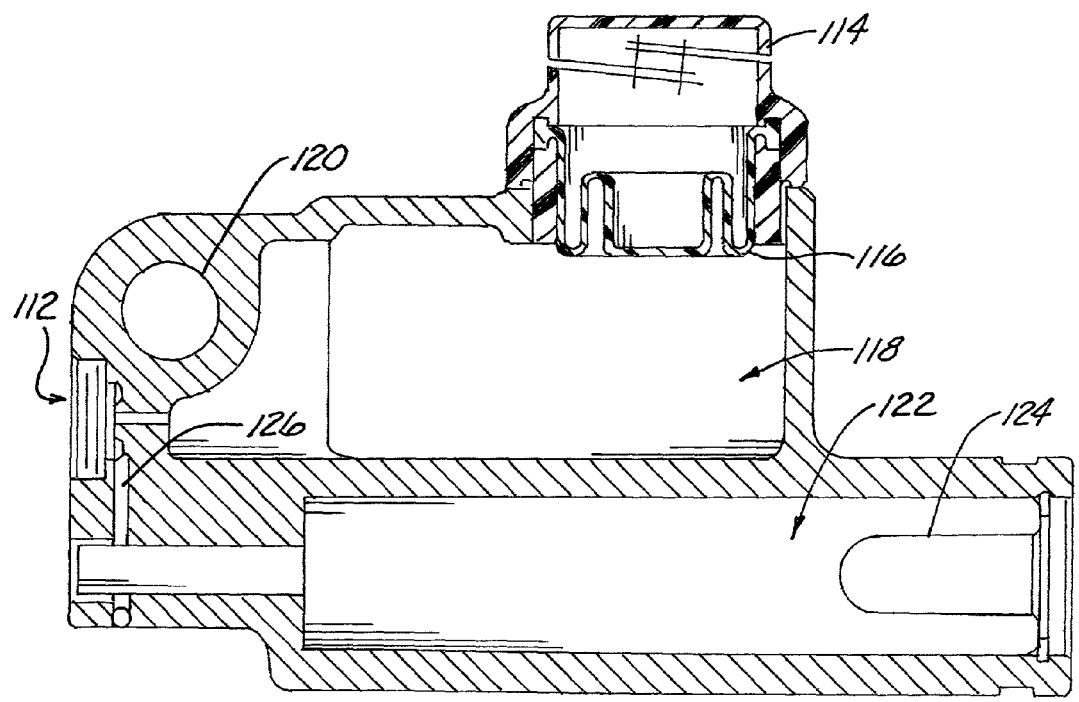
Fig. 18

ACTUATOR/COUPLER FOR TOWED AND TOWING VEHICLE COMBINATION

RELATED APPLICATIONS

Priority is hereby claimed to U.S. Provisional Application No. 60/376,781 filed on Apr. 30, 2002, and said application is incorporated herein by reference.

BACKGROUND OF THE INVENTION

1. Field of the Invention

The present invention relates to an actuator/coupler device. In particular, to a device attached to a towed vehicle for releasably coupling the towed vehicle to a towing vehicle, and for actuating brakes on the towed vehicle.

2. Background

Devices for coupling towing and towed vehicles are well known in the art. These devices are necessary in order to assist the towing vehicle in braking situations. When the towing vehicle slows the towed vehicle tends to push or override the towing vehicle, thereby directing the momentum of the towed vehicle onto the towing vehicle during repeated stopping, which results in premature wear on the brakes of the towing vehicle. In addition, to increasing the wear on the towing vehicle brakes this effect can also make the towing vehicle difficult to control. In extreme situations this can lead to a jack-knife condition, or loss of control of the vehicles. Accordingly, a number of devices have been used over the years to not only couple a towed and towing vehicle, but also to assist in braking the towed vehicle in coordination with the towing vehicle under actual driving conditions.

These devices were originally quite simple and of limited effectiveness, especially for larger more modern towed and towing vehicle combinations. In recent times, the growth of the use of towed vehicles along with the increase in the size of such vehicles has required the development of more sophisticated devices. In particular, in order to ease the strain on the brakes of the towing vehicle and to provide strong braking in emergency situations, like in a break away situation, towed vehicles utilize independent brake systems actuated in response to changes in the speed of the towing vehicle.

The prior art discloses a number of methods for providing such capability. These include the use of electrical sensors to sense when the towed vehicle pushes against the towing vehicle, however, these systems proved troublesome in actual practice. Other systems utilize devices designed to sense changes in momentum between the towed and towing vehicles and apply towed vehicle brakes in response thereto.

One such device is disclosed in U.S. Pat. No. 5,013,059. The device includes a housing and a telescopically attached coupler. The coupler includes a brake actuator and shock absorber combination that is activated in response to compression of the housing and coupler caused by slowing of the towing vehicle. The device includes front and rear roller shafts, which extend through holes and slots in the coupler and housing, and which support a front and rear pair of juxtaposed rollers to facilitate low friction movement of the coupler and housing relative to each other. Because of the specific arrangement of the components the device requires that the front rollers extend through slots in the coupler to engage the inner surface of the housing. For this and other reasons, the device suffers from a number of practical operational drawbacks.

Thus, a need exists for an improved and simplified actuator/coupler device designed for attachment to the towed vehicle and for releasably coupling the towed vehicle to the towing vehicle, and for actuating brakes on the towed vehicle.

SUMMARY OF THE INVENTION

An object of the present invention comprises providing an improved actuator/coupler device attached to a towed vehicle for releasably coupling the towed vehicle to a towing vehicle, and for actuating brakes on the towed vehicle.

These and other objects of the present invention will become apparent to those skilled in the art upon reference to the following specification, drawings, and claims.

The present invention intends to overcome the difficulties encountered heretofore. To that end, the present invention comprises an actuator/coupler device attached to a towed vehicle for releasably coupling the towed vehicle to a towing vehicle, and for actuating brakes on the towed vehicle, wherein the point of coupling is a coupler ball attached to the towing vehicle. In particular, the device comprises a generally rectangular shaped housing for attachment to the towed vehicle, and a generally hollow coupler correspondingly shaped for telescopic attachment to the housing. A roller shaft extends through a hole in the housing and extends through an elongated slot in the coupler thereby providing a point of attachment for the coupler and the housing that allows for limited movement of the coupler relative to the housing. A pair of opposing rollers secure to the roller shaft and are located inside the generally hollow interior of the coupler whereby the rollers roll on a surface within the generally hollow interior of the coupler. A brake actuator secures within the generally hollow interior of the coupler, wherein a first end of the brake actuator is secured to the roller shaft and a second end of the brake actuator is fixed to the coupler, wherein the brake actuator is in operable communication with the brakes of the towed vehicle such that the brake actuator is actuated by movement of the coupler relative to the housing. A coupler ball socket is included within the generally hollow interior of the coupler for releaseable attachment of the coupler ball attached to the towing vehicle.

BRIEF DESCRIPTION OF THE DRAWINGS

FIG. 9 is a cross section view of the device taken along the line L-L shown in FIG. 8; and shows in detail item f in FIG. 1.

FIG. 10 is a top view of the device, and shows in detail item c in FIG. 1.

FIG. 17 is a top view of the master cylinder.

FIG. 18 is a side cross sectional view of the master cylinder.

DETAILED DESCRIPTION OF THE INVENTION

Figure 13:
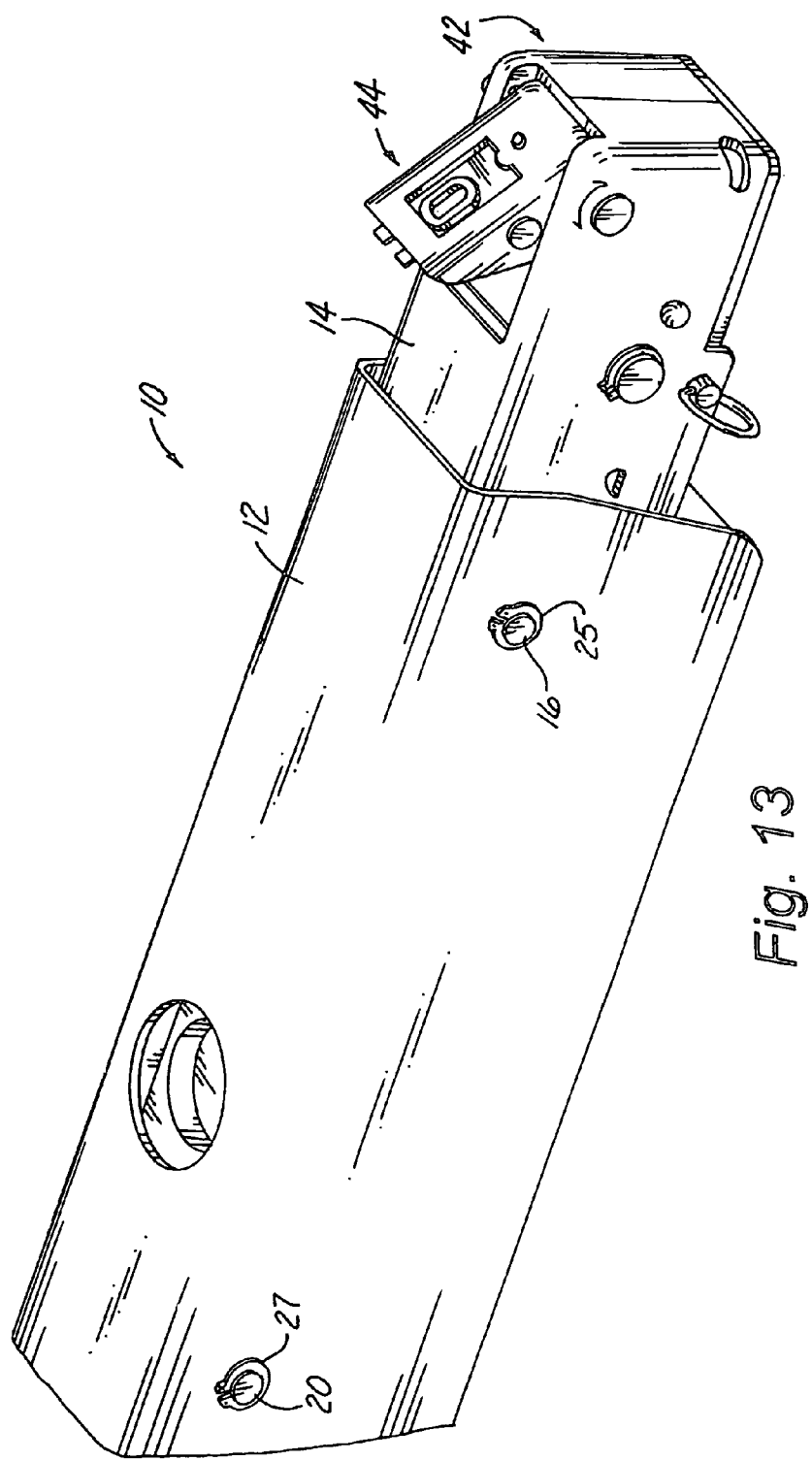
FIG. 13 is a perspective view of the device.
Figure 14:
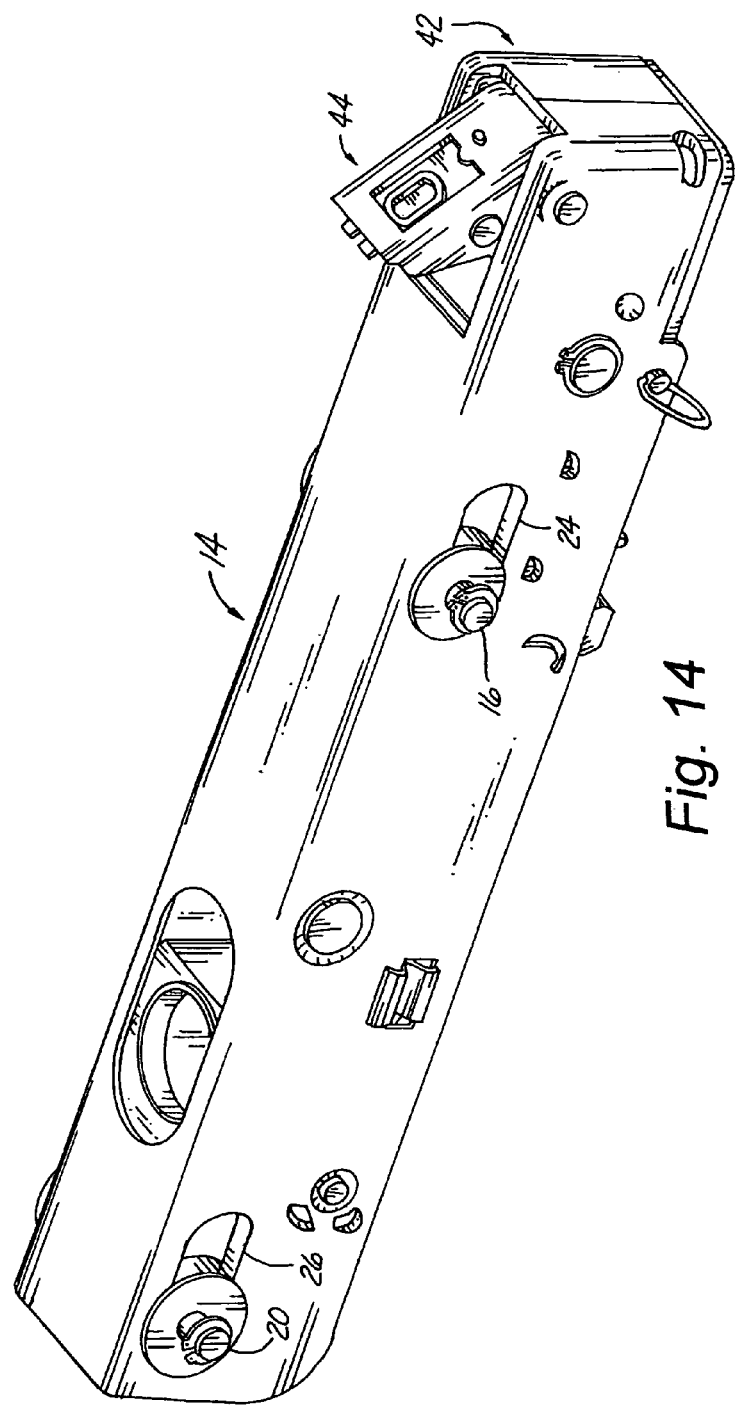
FIG. 14 is a perspective view of a coupler of the device.

In the Figures, an actuator/coupler device 10 is shown. In particular reference to FIGS. 13-15 the device includes a generally hollow 3-sided housing 12 that telescopically houses a coupler 14. Forward and rear coupler shafts 16, 20 secure the coupler 14 and housing 12. As shown in FIG. 13, the forward and rear coupler shafts 16, 20 secure through forward and rear housing holes 25, 27 in the housing 12. The holes 25, 27 fix the movement of the shafts 16, 20 relative to the housing 12. As shown in FIG. 14, the shafts 16, 20 pass through forward and rear coupler slots 24, 26 in the coupler 14. In this manner, the elongated forward and rear coupler slots 24, 26 allow for limited lateral movement of the coupler 14 relative to the housing 12.

Figure 11:
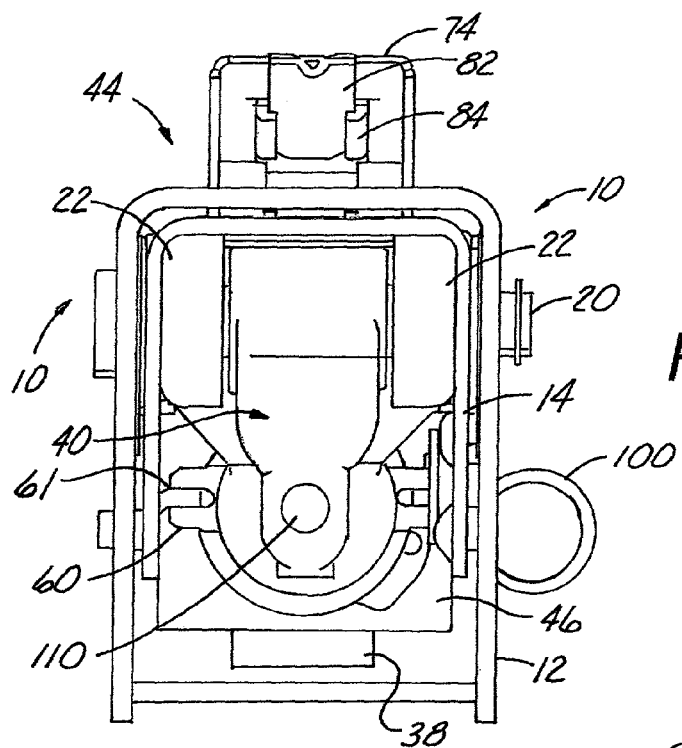
FIG. 11 is a rear end view of the device, and shows in detail item a in FIG. 1.
Figure 15:
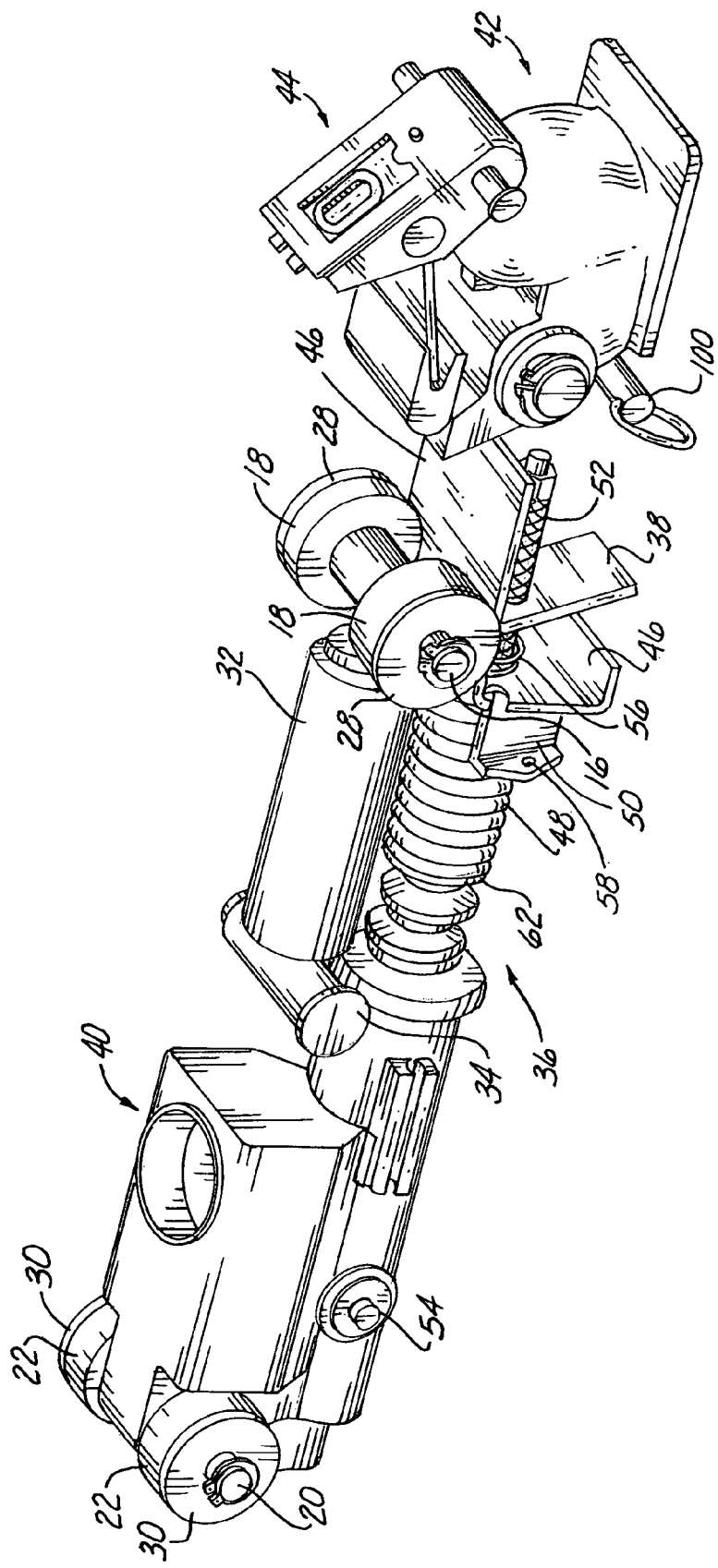
FIG. 15 is a perspective view of the internal components of the coupler.

FIG. 15 shows the internal components of the device 10 located within the coupler 14. These components include a pair of opposing forward rollers 18, and a pair of opposing rear rollers 22. The respective roller shafts 16, 20, along with forward and rear bushings 28, 30 hold and align the forward and rear rollers 18 within the coupler 14 and housing 12. A dampener/shock absorber 32 is affixed between the opposing pair of forward rollers 18 and through the forward roller shaft 16. The opposite end of the dampener 32 is secured to the coupler 14 through a dampener shaft 34 that secures to a central portion of the coupler 14. An inner L-shaped plate 46 rigidly secures inside the coupler 14. A brake piston rod assembly 36 secures on one end to the inner plate 46, while the other end of the brake piston assembly 36 operationally integrates into a master cylinder assembly 40 and is secured to the rear roller shaft 20 between the rear rollers 22. The master cylinder assembly 40 includes a throughbore 120 (see FIG. 18) for receipt of the rear roller shaft 20, and also is retained on either side with grooved slots 60 in the outer side walls of the master cylinder assembly 40 that align with a protruding ribs 61 on either side of the inner side walls of the coupler 14 (see FIG. 11). This arrangement allows for lateral movement of the master cylinder assembly 40 relative to the coupler 14, but prevents any substantial vertical movement thereof.

Figure 21:
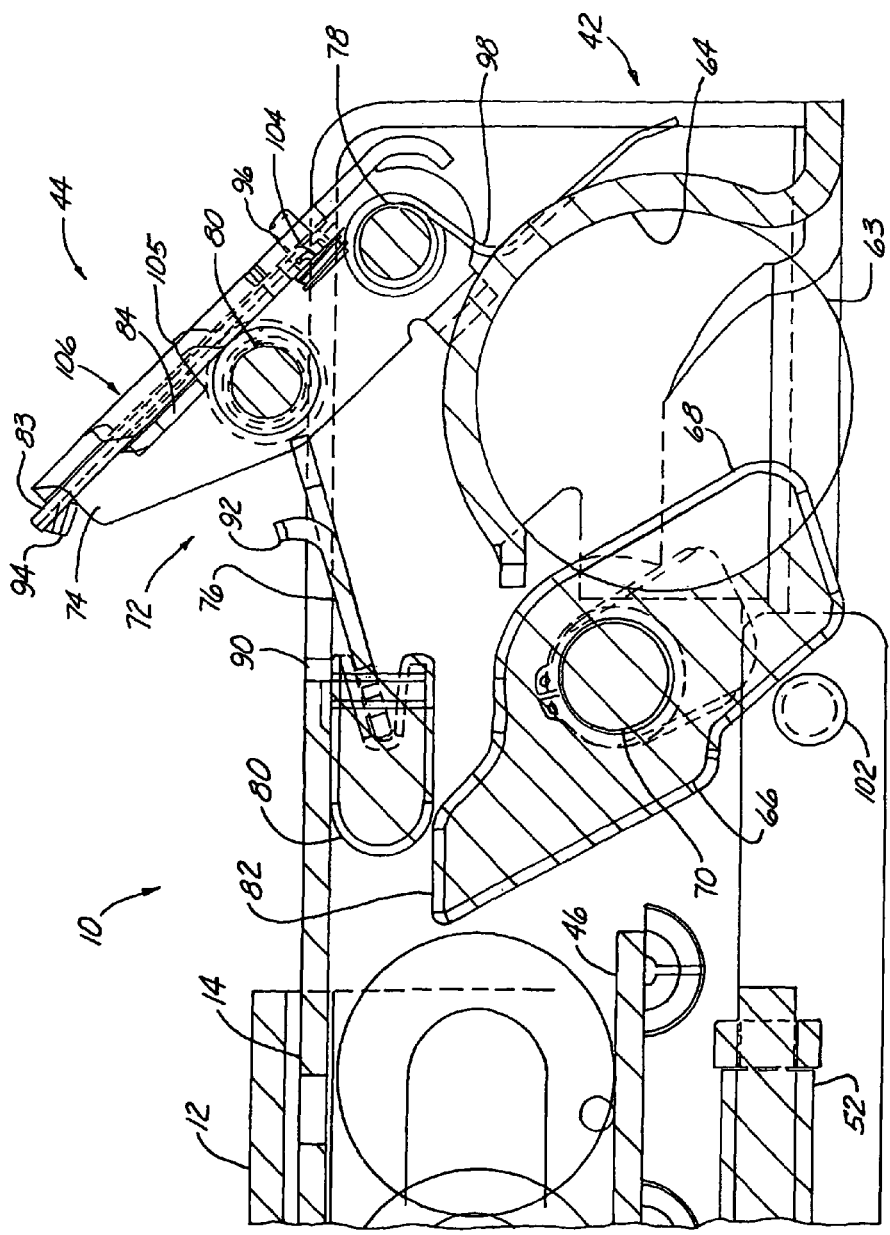
FIG. 21 is a portion of the device depicted in FIG. 2, enlarged to show a safety latch and trailer hitch of the device.

The device 10 attaches at its forward end to a towing vehicle (not shown) with trailer hitch 42 incorporated into the forward end of the coupler 14. The trailer hitch 42 is operationally secured in place to a coupler ball 63 (see FIG. 21) attached to the towing vehicle with a double pivot spring loaded wedge or slide lock 44. The rearward end of the housing 10 secures to a towed vehicle (not shown).

In operation, the device 10 operates the brakes (not shown) of the towed vehicle in response to decelerations of the towing vehicle. Such decelerations of the towing vehicle cause the towed vehicle to compress housing 12 relative to the coupler 14 of the device 10. Because the rear roller shaft 20 is fixed to the housing 12 with regard to lateral movement, this compression forces the rear roller shaft 20 and rear pair of rollers 30 forward in the rear slot 26 of the coupler 14. The rear rollers 30 ride on an upper inside surface of the coupler 14. The forward movement of the rear roller 30 moves the master cylinder assembly 40 forward by virtue of the fact that the rear roller shaft 20 is affixed through throughbore 120 in the rearward end of the master cylinder assembly 40, this movement results in the compression of a brake piston 124 (see FIG. 18) contained within the master cylinder assembly 40 thereby actuating, via a hydraulic connection 110 to the master cylinder assembly 40, the brakes of the towed vehicle. An actuator spring 48 of the brake piston rod assembly 36 that surrounds a piston rod 52 provides sufficient biasing force to counteract emergency actuation of the brake piston 124, which is described in detail hereinbelow. The actuator spring 48 is held in place on one end by a washer 62 and by a safety clip 50 on the other end that rigidly attaches to the piston rod 52.

The device 10 also includes a dampener 32 that operates in a manner similar to that described with regard to the brake system. In particular, movement of the towing vehicle relative to the towed vehicle in either direction will result in corresponding movement of the housing 12 relative to the coupler 14. Because the front roller shaft 16 is fixed relative to lateral movement to the housing 12, movement of the housing 12 relative to the coupler 14 will also result in movement of the front pair of rollers 18. The front rollers 18 move on the upper surface of the inner plate 46, which is rigidly affixed to the coupler 14. This movement of the front rollers 18 will translate to the dampener 32, which on its other end is rigidly fixed by the dampener shaft 34 to the coupler 14. The dampener 32 thereby acts in response to movement of the coupler in both directions to return the front pair of rollers 18, as well as the housing 12 and coupler 14, to a neutral position.

As mentioned briefly hereinabove, the device 10 also includes a safety mechanism that will allow the brakes of the towed vehicle to apply in the event that the towed vehicle breaks away from the towing vehicle. In particular, a safety cable (not shown) attaches on one end to the towing vehicle. The other end attaches through an eyelet 58 of the spring clip 50. The safety cable wraps around a safety cable ring 54 and returns for connection to the towing vehicle. The safety cable ring 54 captures the safety cable between the ring 54 and the inside of the coupler 14. The safety cable wraps around the rounded center portion of the ring 54, which avoids sharp bends in the safety cable that might tend to weaken or damage the safety cable. In the event of a breakaway, the safety cable is pulled tight around the safety cable ring 54 thereby removing the slack and compressing the spring 48 by pulling the spring clip 50 rearward and away from the inner plate 46. This moves the piston rod 52 rearward toward the master cylinder assembly 40 thereby compressing the brake piston 124 and applying the towed vehicle brakes. A safety catch 38 captures the piston rod 52 to retain it in position to maintain brake pressure until the safety catch 38 is manually released. The spring 48 biases the piston rod 52 back to its neutral position upon release of the safety catch 38. The forward end of the piston rod 52 contains friction grooves to facilitate capture by the safety catch 38. In other words, the piston 52 passes through holes in the safety catch 38, inner plate 46, and spring clip 50 which is rigidly attached to the piston rod 52. This allows the piston rod 52 to compress under the influence of the safety cable to actuator the brake piston 124. Also, a spring 56 surrounding the piston rod 52 and located between the inner plate 46 and safety catch 38 biases the safety catch 38 after release of the safety catch 38.

Figure 1:
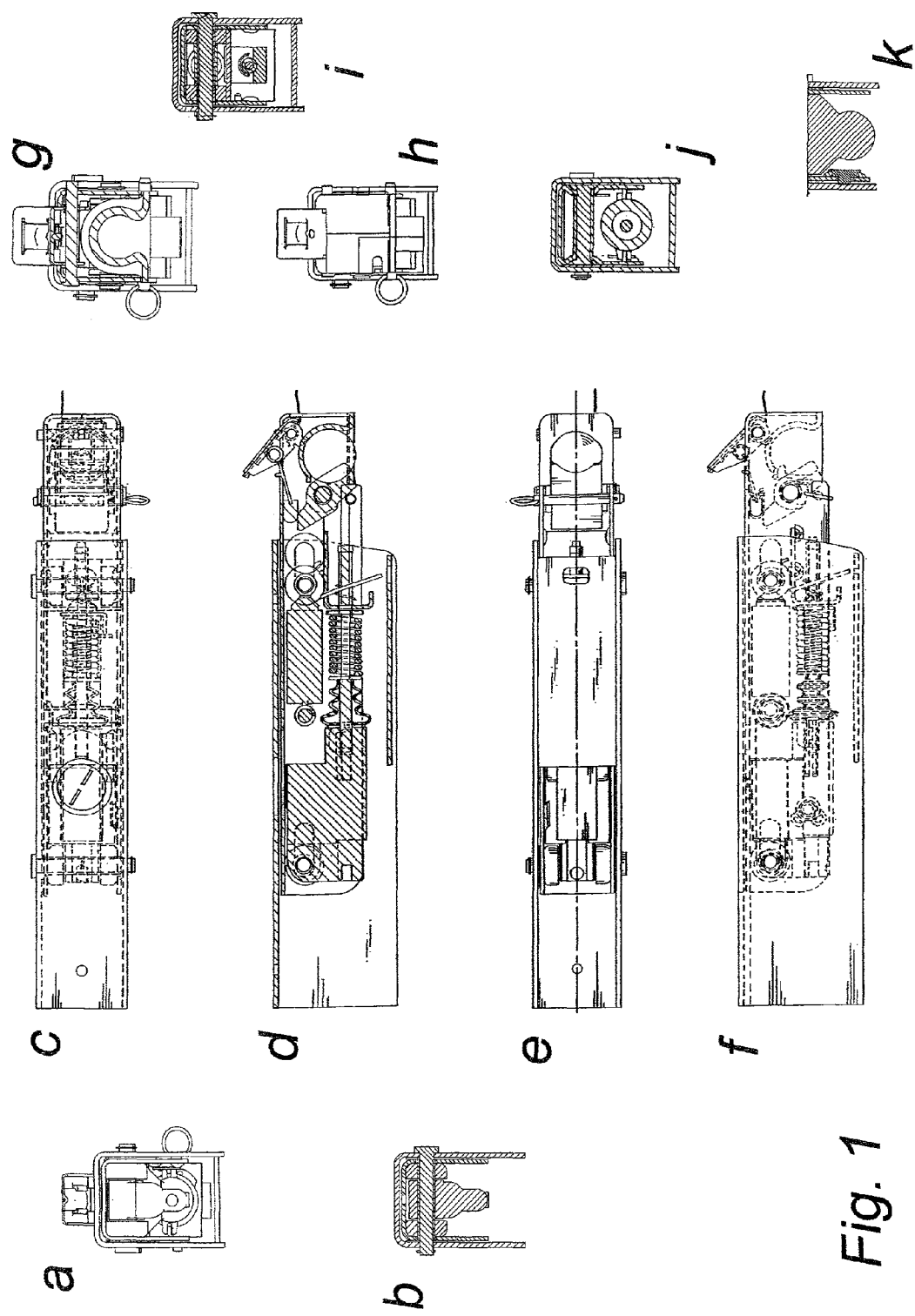
FIG. 1 is a composite of several views of an actuator/coupler device, with the views labeled a-k and appearing in greater detail in FIGS. 2-12.
Figure 2:
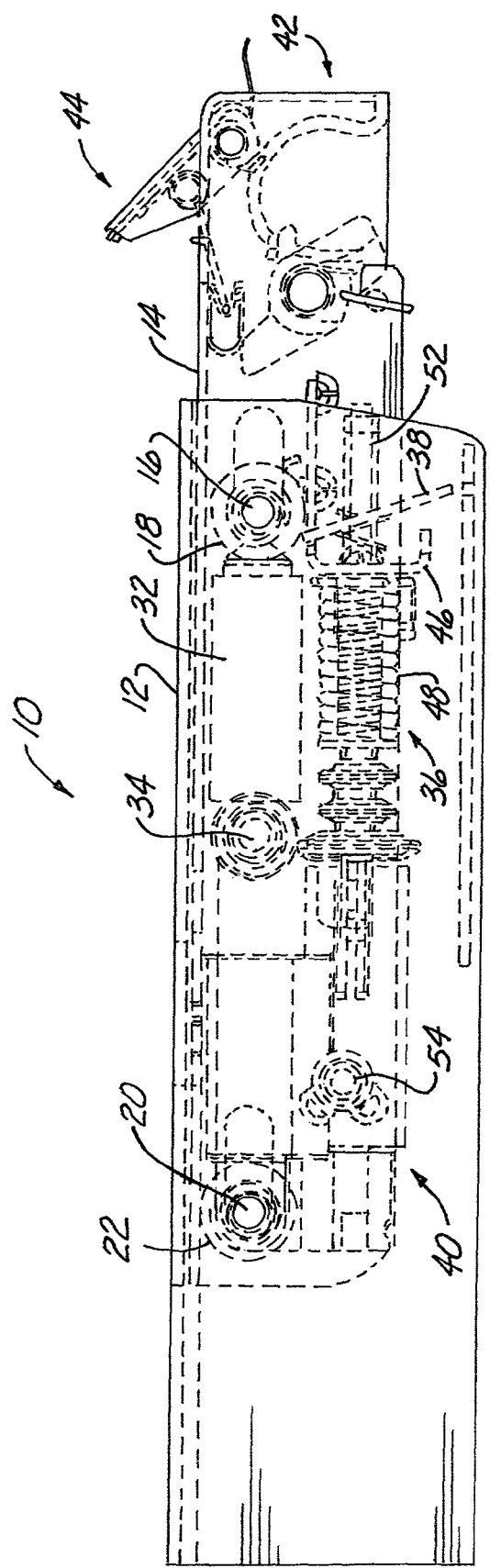
FIG. 2 is a side view of the device, and shows in detail item d in FIG. 1.
Figure 3:
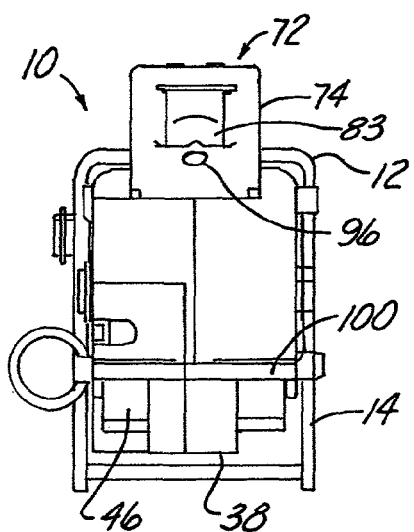
FIG. 3 is a cross section view of the device taken along the line U-U shown in FIG. 2, and shows in detail item h in FIG. 1.
Figure 4:
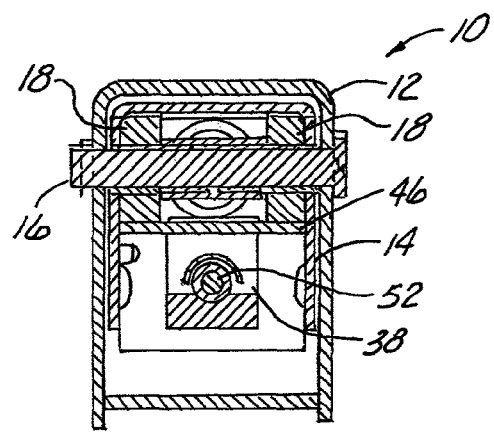
FIG. 4 is a cross section view of the device taken along the line R-R shown in FIG. 2, and shows in detail item i in FIG. 1.
Figure 5:
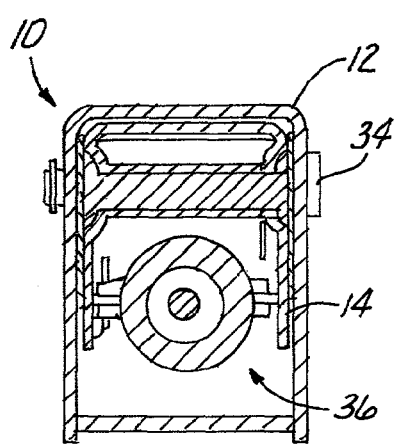
FIG. 5 is a cross section view of the device taken along the line Q-Q shown in FIG. 2, and shows in detail item j in FIG. 1.
Figure 6:
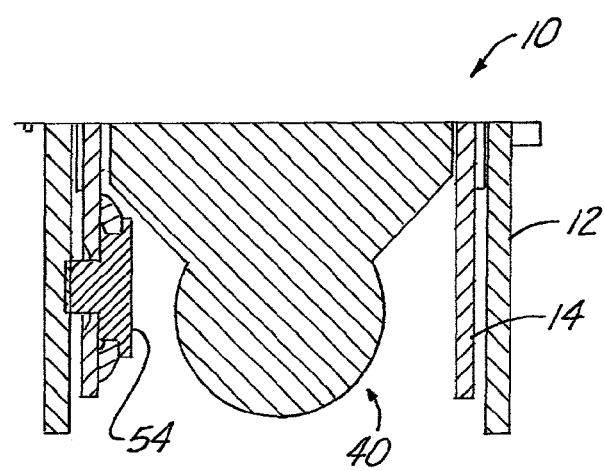
FIG. 6 is a cross section view of the device taken along the line T-T shown in FIG. 2, and shows in detail item k in FIG. 1.
Figure 7:
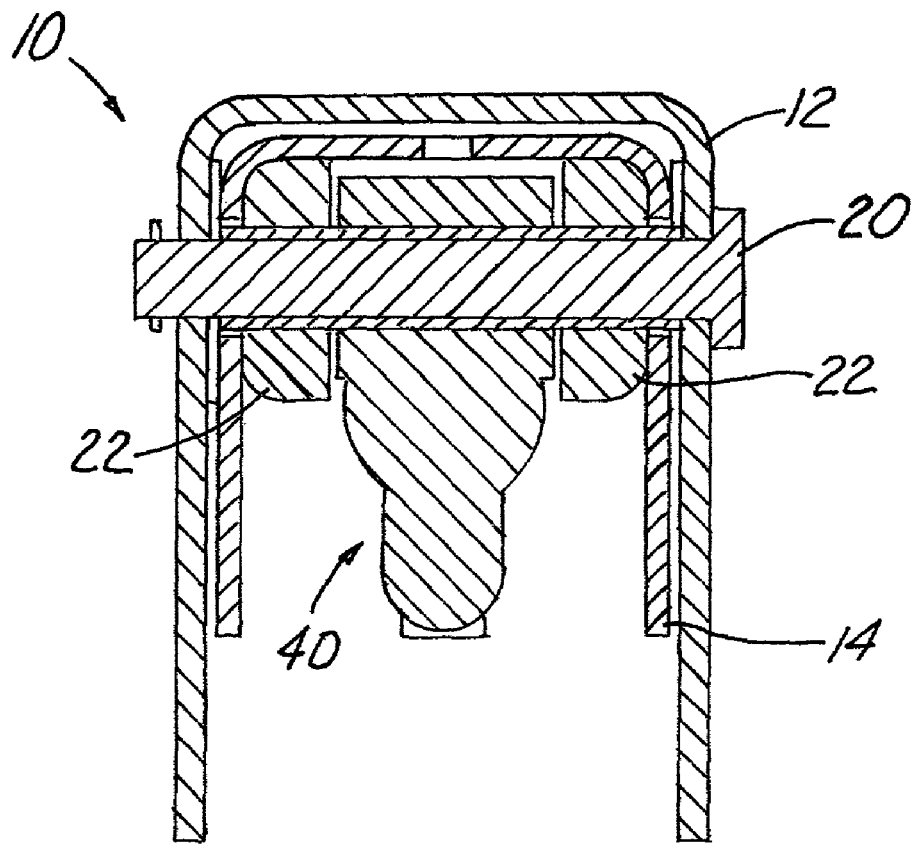
FIG. 7 is a cross section view of the device taken along the line N-N shown in FIG. 2, and shows in detail item b in FIG. 1.
Figure 8:
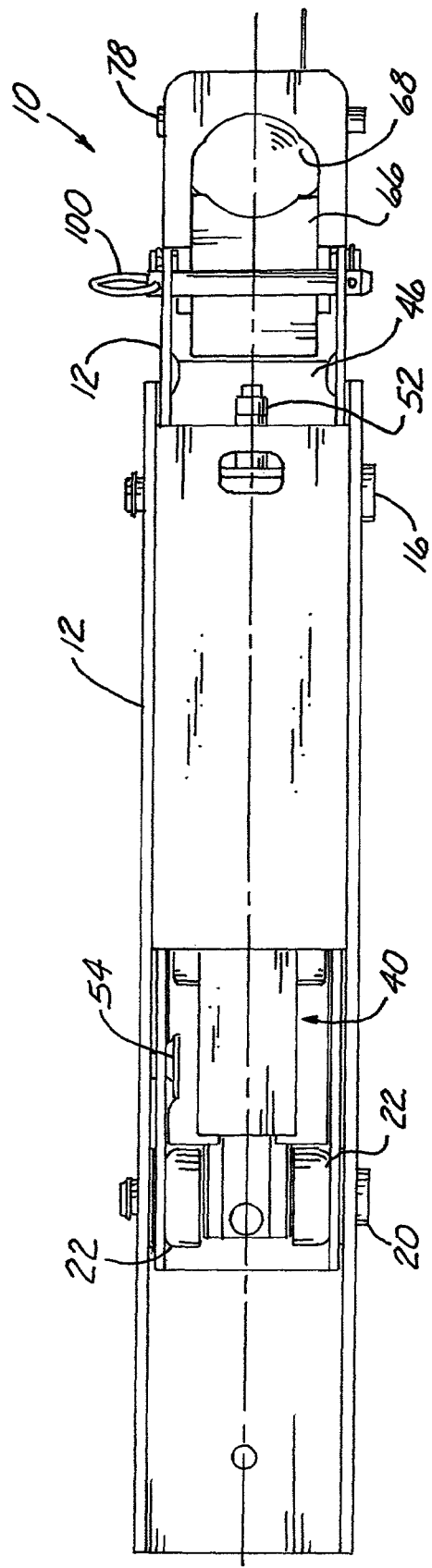
FIG. 8 is a bottom view of the device, and shows in detail item e in FIG. 1.
Figure 12:
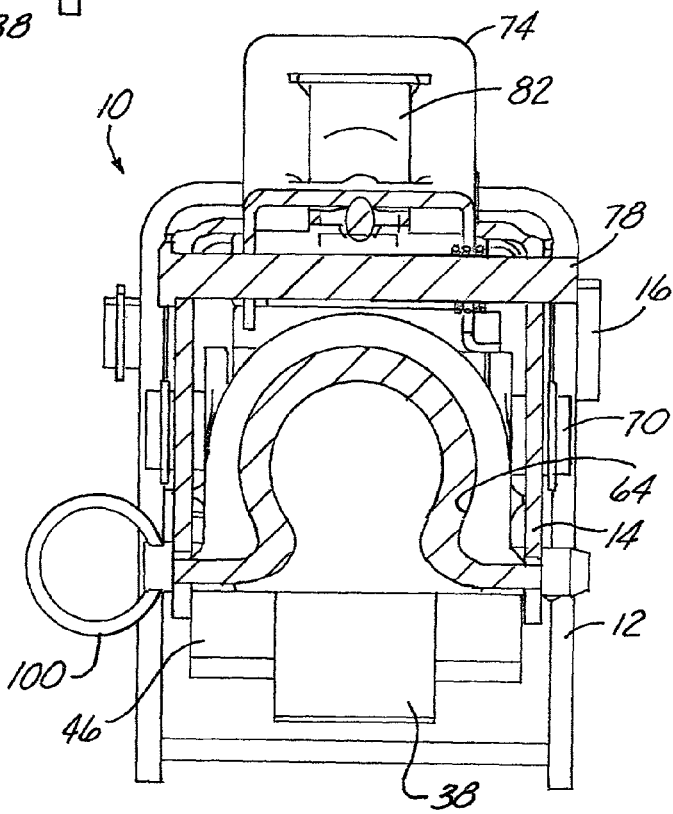
FIG. 12 is a front end view of the device, and shows in detail item g in FIG. 1.

The remaining Figures show detailed views of the device including cross sectional views designed to better show the orientation of the various components of the device 10, including those components discussed hereinabove. One of the components of the device 10 shown in the remaining Figures but not already discussed in detail comprises the trailer hitch 42 and safety latch 44 (shown best in FIG. 21). In particular, the forward portion of the coupler 14 includes a curved underside portion 64 designed to receive the coupler ball 63 located on the back of the towing vehicle (see FIGS. 2, 11, 12). Insertion of the coupler ball 63 into the socket formed by the curved underside portion 64 initially moves a latch 66 into a substantially vertical position. A lower portion 68 of the latch 66 is curved in the shape of the coupler ball 63 and is designed to fit around the under side of the coupler ball 63 upon complete insertion of the coupler ball 63 and securement of the safety latch 44. The latch 66 pivots about a shaft 70 between a position that allows for insertion and a position that allows for removal of the coupler ball 63. An upper portion of the safety latch 44 includes a double pivoting latch cap 72 that consist of a latch top 74 and an extendable wedge plate 76. The latch top 74 pivots about a top shaft 78, and the extendable wedge plate 76 pivots about a wedge shaft 80 located toward the center of the latch top 74. Moving the latch cap 72 downward into the locking position moves the extendable wedge plate 76 into contact with an upper edge 82 of the latch 66 and rotates the latch 66 in a counterclockwise direction to the position shown in FIG. 21. The extendable wedge plate 76 includes a wedge end 80 designed to move over the upper edge 82 of the latch 66. This, in turn, rotates the curved lower portion 68 of the latch 66 into contact with the lower portion of coupler ball 63 to prevent removal of the coupler ball 63 from the trailer hitch 42 of the coupler 14. Furthermore, with the wedge end 80 in place next to the upper edge 82 of the latch 66, the latch 66 is prevented from moving in a clockwise manner that would release the coupler ball 63.

Continued downward movement of the latch cap 72 places the latch top 74 flush with the upper surface of the coupler 14. The center portion of the latch top 74 includes a lock plate 83 that is biased by a spring 104 to extend the leading edge of the lock plate 83 into a position to allow it to secure under a lip 90 in the coupler, when the latch cap 72 is in the locked position. With the edge of the lock plate 83 secured under the hop 90 of the housing 14, the latch cap 72 is in the locked position. To further secure the latch top 74, the underside of the forward edge of the lock plate 83 includes a centrally located wedged shape portion 94 that fits between the lip 90 and a hook 92 located in the top center of the extendable wedge plate 76. This helps prevent the leading edge of the lock plate 83 from slipping out from under the lip 90 in the top of the coupler 14 when the latch plate 72 is in the locked position. The lock plate 83 is secured to the latch top 74 by two opposing channels 84 (see FIG. 11), and by a rivet 96 in the latch top 74. In addition, a safety pin 100 is inserted through hole 102 in the coupler 14 to further secure the latch 66 from movement when the latch 66 is in the locked position.

To facilitate insertion and removal of the lock plate 83 from under the lip 90 in the coupler 14, the latch plate 83 includes a rib 105 that extends upward from the lock plate 83 and includes an open area 106 between the two opposing channels 84. Pressure applied to the rib 105 will allow for compressing the lock plate 83 against a spring 104 located around the rivet 96. The spring 104 biases the lock plate 83 so that the leading edge protrudes. Compressing the spring 104 will allow for inserting and removing the lock plate 83. Also, if necessary a tool like a screw driver can be inserted in the open area 106 to move the lock plate 83. The latch cap 72 is gently biased by a spring 98 to raise the latch cap 72 into the position shown in the Figures upon release of the lock plate 83 from under the lip 90 in the coupler 14.

Figure 16:
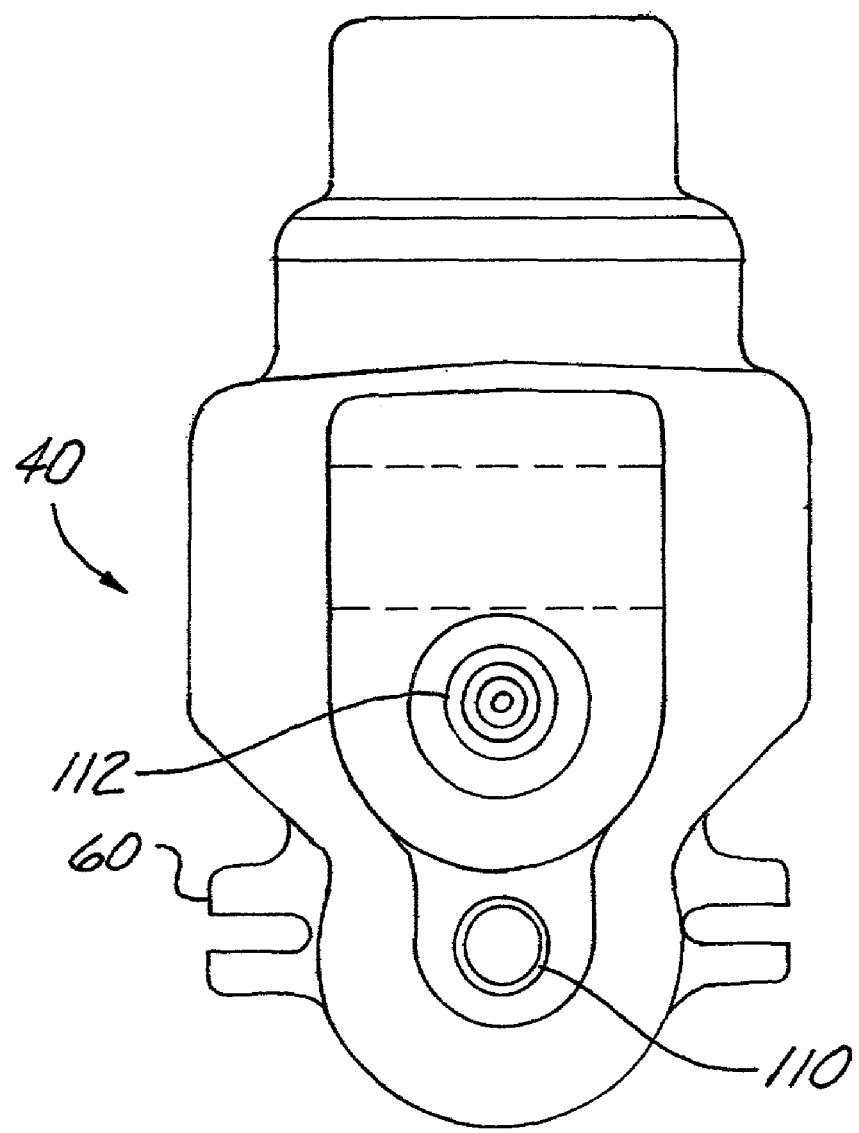
FIG. 16 is a rear view of a master cylinder assembly of the device.
Figure 19:
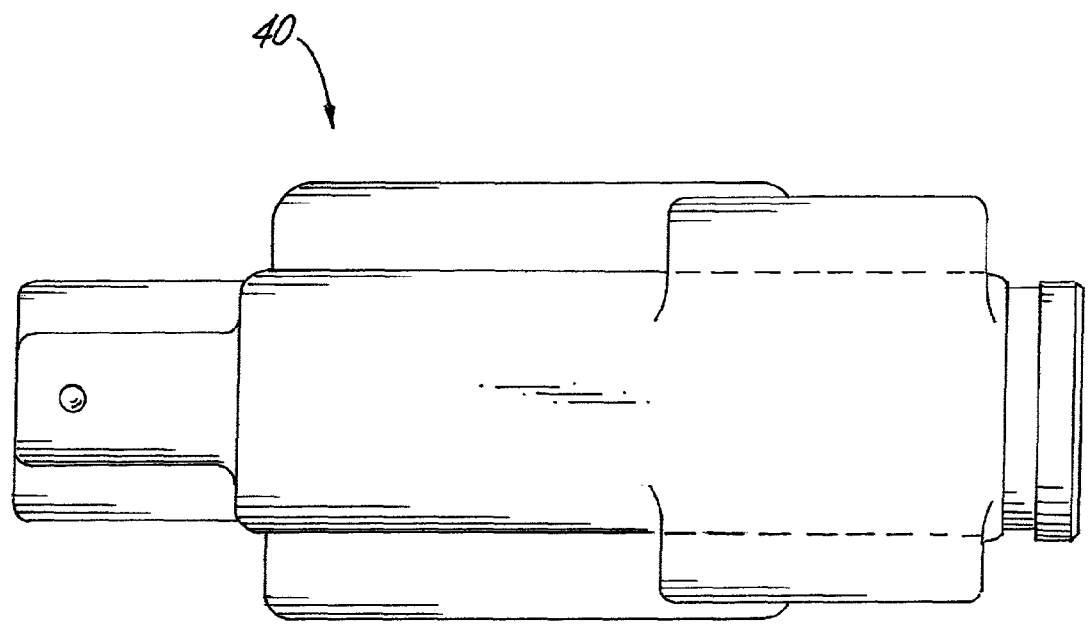
FIG. 19 is a bottom view of the master cylinder.
Figure 20:
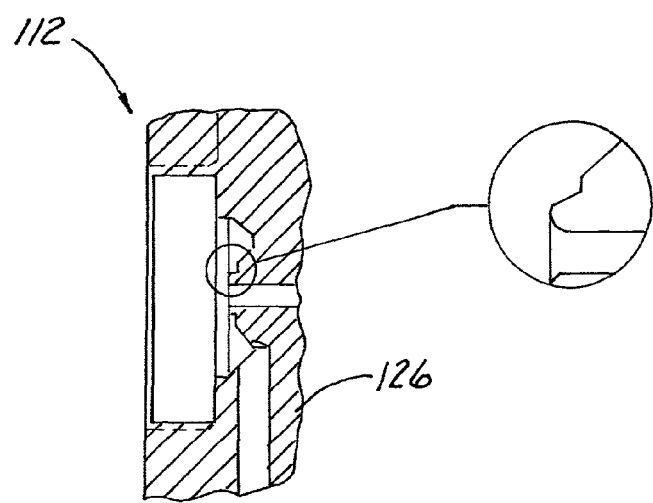
FIG. 20 is an enlarged side cross sectional view of a valve cavity of the master cylinder.

FIGS. 16-20 show in detail the master cylinder assembly 40, which is generally of a conventional design. In particular, FIG. 16 shows a rear view of the master cylinder assembly 40 that includes a hydraulic line port 110 for connecting a hydraulic line between the brakes of the towed vehicle and the master cylinder assembly 40. The rear of the master cylinder assembly 40 also includes a valve cavity 112 for attachment of a solenoid (not shown) the purpose of which is described in detail hereinbelow. The master cylinder assembly 40 includes a fill cap 114 and a diaphragm 116 to allow for operational sealing and filling of a brake fluid reservoir 118. Alternatively, a standard fill cap with a relief valve can be used. Hydraulic fluid is transmitted to a hydraulic cylinder 122 through a plurality of ports (not shown). The hydraulic cylinder 122 also includes a hydraulic piston 124 (see FIG. 18) that is an extension of piston rod 52. The master cylinder assembly 40 includes the throughbore 120 for mounting to the rear roller shaft 20.

In operation, the hydraulic cylinder 122 also includes a spring (not shown) at an end opposite to the hydraulic piston 124 that acts to return the hydraulic piston 124 to a neutral position after actuating the brakes. A circular cup (not shown) surrounds the outside of the hydraulic piston 124 to help create pressure during actuation. The master cylinder assembly 40 includes a centrally located port (not shown) to allow for fluid communication between the reservoir 118 and the hydraulic cylinder 122. With the hydraulic piston 124 in a neutral position the central port is uncovered to allow the hydraulic cylinder 122 to fill with fluid. Upon forward movement of the master cylinder assembly 40 the hydraulic piston 124 is captured between the circular cup and moves forward until it covers the central port and cuts off the flow of fluid between the reservoir 118 and the hydraulic cylinder 122. This allows for compression of the hydraulic fluid in the hydraulic cylinder 122 thereby creating pressure to actuator the brakes of the towed vehicle. After braking, the spring provides a biasing force to return the hydraulic piston 122 to its neutral position, and ports (not shown) at the piston end of the hydraulic cylinder 122 allow for fluid to backfill into the hydraulic cylinder 122 to further assist in retraction of the hydraulic piston 124.

The master cylinder assembly 40 includes a solenoid (not shown) that attaches to the valve cavity 112. The solenoid provides control over fluid communication through a backup port 126 between the reservoir 118 and the hydraulic cylinder 122. The need for fluid communication through the backup part 126 arises when the towing vehicle backs up with the towed vehicle attached. Movement of the coupler 14 relative to the housing 12, created by slowing of the towing vehicle, results in application of the towed vehicle brakes, however, the same relative movement results if the towing vehicle backs up. In this situation the towed vehicle brakes would be undesirably actuated. To avoid this situation a solenoid is attached to the master cylinder assembly 40 at the valve cavity 112. The solenoid is normally in the closed position, which will prevent fluid communication between the reservoir 118 and the hydraulic cylinder 122 via the back up port 126. The solenoid is electrically connected to the towing vehicle to open and allow fluid communication via the back up port 126 when the towing vehicle is placed in a reverse gear. This avoids application of the towed vehicle brakes by allowing the hydraulic fluid to flow unrestricted between the reservoir 118 and the hydraulic cylinder 122, thereby preventing any pressure build up in the hydraulic cylinder 122.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

The invention claimed is:

1. A brake actuator for operating the brakes of a towed vehicle in response to the towing vehicle, comprising:
   a) a generally hollow three-sided rectangular housing extending generally to two ends, the rear end for attachment to the towed vehicle;
   b) a generally hollow coupler for attachment to the towing vehicle, the coupler being of a corresponding shape to the housing, telescopically extending from the front end of the housing, further comprising front and rear roller shafts set inside front and rear housing holes;
   c) a coupler ball socket for attachment to the towing vehicle;
   d) a plurality of rear rollers secured within the coupler wherein the rear rollers roll on the upper inside surface of the coupler; connected to
   e) said rear roller shaft connecting the housing and the coupler by way of a rear elongated slot in the coupler and said rear housing hole in the housing, wherein the rear roller shaft allows for limited relative telescopic movement of the coupler relative to the housing;
   f) said front roller shaft connecting the housing and the coupler by way of a front elongated slot in the coupler and said front housing hole in the housing, wherein the front roller shaft allows for limited relative telescopic movement of the coupler relative to the housing;
   g) a plurality of front rollers completely enclosed within the coupler and secured to the front roller shaft;
   h) an inner L-shaped plate, affixed to the coupler, wherein said front rollers roll only on the upper surface of the L-shaped plate within the coupler;
   i) a dampener, affixed between the front and rear rollers and secured to the coupler, wherein in response to the movement of the towing vehicle relative to the towed vehicle, the coupler will correspondingly move relative to the housing, thereby causing the movement of the front rollers along the upper surface of the inner L-shaped plate and transferred to the dampener, the dampener responding to the movement to return the actuator to a neutral position;
   j) a dampener shaft, fixed to the dampener and to the coupler by way of holes in the coupler;
   k) a brake piston rod assembly, secured on one end to the L-shaped plate, and on the other end to the dampener shaft, the brake piston rod assembly further comprising an actuator spring surrounding a brake piston rod attached to a brake piston; the brake piston being partially housed within
   l) a master cylinder assembly affixed to the rear roller shaft by way of slots in the master cylinder assembly that align with protruding ribs on the inner walls of the coupler, the master cylinder assembly further comprising a hydraulic cylinder, wherein when the brake piston rod is moved toward the master cylinder assembly by activation of the brake piston rod assembly, the brake piston compresses into the hydraulic cylinder to activate the towed vehicle brakes by way of a hydraulic connection; and
   m) a safety mechanism, further comprising a safety cable, a spring clip, a safety cable ring, and a spring, which are in operational communication with the piston rod wherein the safety cable attaches to the towing vehicle, the spring clip and the safety cable ring, such that when the towing vehicle reaches a sufficient distance from the towed vehicle, the safety cable is pulled taut around the safety cable ring, which pulls the spring clip rearward and compresses the actuator spring so as to move the piston rod toward the master cylinder assembly to actuate the brakes of the towed vehicle.

2. The brake actuator of claim 1 wherein the housing detaches from the coupler by removing the front and rear roller shafts.

3. The brake actuator of claim 1 wherein said safety mechanism secured to the inner L-shaped plate within the generally hollow interior of the coupler, whereby the piston rod moves toward the master cylinder assembly to actuate the brakes in the event that the towed vehicle becomes detached from the towing vehicle.

4. The brake actuator of claim 1 wherein the brake piston rod assembly further comprises friction grooves to facilitate capture by a safety catch.

5. The brake actuator of claim 1 further comprising: a) a brake fluid reservoir; b) a fill cap; and c) a diaphragm, wherein the fill cap and diaphragm act to seal and fill the brake fluid reservoir.

6. The brake actuator of claim 5 further comprising a hydraulic line port for connection to the brakes of the towed vehicle.

7. The brake actuator of claim 6 further comprising a brake piston spring for returning the brake piston to a neutral position after actuating the brakes.

8. The brake actuator of claim 7 further comprising a solenoid having both open and closed positions and a valve cavity for control of fluid communication in the hydraulic chamber during reversing of the towing and towed vehicles, wherein the solenoid is in communication with the towing vehicle and normally closed so as to prevent fluid communication between the reservoir and the hydraulic cylinder, but is be opened in when it is indicated that the towing vehicle is in reverse so as to allow free fluid movement between the reservoir and hydraulic cylinder so as to disengage the actuator and permit reversal of the towed vehicle without actuating the brakes.

* * * * *